(12) United States Patent
Li et al.

(10) Patent No.: US 9,774,705 B2
(45) Date of Patent: Sep. 26, 2017

(54) ROUTER-BASED NETWORKING CONTROL

(71) Applicant: Xiaomi Inc., Beijing (CN)

(72) Inventors: Zheng Li, Beijing (CN); Tiejun Liu, Beijing (CN); Liang Cheng, Beijing (CN)

(73) Assignee: Xiaomi Inc., Beijing (CN)

( * ) Notice: Subject to any disclaimer, the term of this patent is extended or adjusted under 35 U.S.C. 154(b) by 209 days.

(21) Appl. No.: 14/670,004

(22) Filed: Mar. 26, 2015

(65) Prior Publication Data

US 2016/0065688 A1 Mar. 3, 2016

Related U.S. Application Data

(63) Continuation-in-part of application No. PCT/CN2015/071878, filed on Jan. 30, 2015.

(30) Foreign Application Priority Data

Aug. 29, 2014 (CN) .......................... 2014 1 0438588

(51) Int. Cl.
*G06F 15/16* (2006.01)
*H04L 29/06* (2006.01)
(Continued)

(52) U.S. Cl.
CPC ........ *H04L 69/16* (2013.01); *G06F 17/30861* (2013.01); *H04L 67/02* (2013.01);
(Continued)

(58) Field of Classification Search
CPC .............................. H04L 63/08–63/108; G06F 17/30861–17/30905; G06C 30/0207–30/0277
See application file for complete search history.

(56) References Cited

U.S. PATENT DOCUMENTS

| | | | | |
|---|---|---|---|---|
| 2002/0178225 | A1* | 11/2002 | Madenberg | .......... G06Q 10/107 709/206 |
| 2004/0015408 | A1* | 1/2004 | Rauen, IV | ............. G06Q 10/10 705/26.41 |

(Continued)

FOREIGN PATENT DOCUMENTS

| | | |
|---|---|---|
| CN | 100472506 C | 3/2009 |
| CN | 102624890 A | 8/2012 |

(Continued)

OTHER PUBLICATIONS

International Search Report dated Mar. 30, 2015 for International Patent Application No. PCT/CN2015/071878, 4 pages.

(Continued)

*Primary Examiner* — David Lazaro
*Assistant Examiner* — Julian Chang

(57) ABSTRACT

In a router, for example, after receiving an HTTP request communicated by a terminal device, the router can determine whether the terminal device has accessed a target webpage through that device, according to identity information of the terminal device included in the HTTP request. Where it is determined that the terminal device has accessed the webpage through the router, an HTTP response message including a URL address of the target webpage can be communicated to the terminal device. Otherwise, an HTTP response message including a URL address of an intermediate webpage of the target webpage can be communicated to the terminal device. Determining that the terminal device has accessed a target webpage through the router provides for the terminal device to bypass the intermediate page and directly access the target page; thus, control to accessing the target webpage is facilitated by the router.

20 Claims, 6 Drawing Sheets

(51) Int. Cl.
  *H04L 29/08* (2006.01)
  *G06F 17/30* (2006.01)
  *G06Q 30/02* (2012.01)
(52) U.S. Cl.
  CPC ........ *H04L 67/025* (2013.01); *H04L 67/2814* (2013.01); *G06Q 30/02* (2013.01); *H04L 63/10* (2013.01)

(56) References Cited

U.S. PATENT DOCUMENTS

| | | | | |
|---|---|---|---|---|
| 2004/0044566 | A1* | 3/2004 | Bostelmann | G06Q 30/02 705/14.16 |
| 2008/0189360 | A1* | 8/2008 | Kiley | G06F 17/30867 709/203 |
| 2010/0144350 | A1* | 6/2010 | Walter | H04W 48/18 455/435.2 |
| 2010/0161795 | A1* | 6/2010 | Deridder | H04L 67/22 709/224 |
| 2010/0274970 | A1* | 10/2010 | Treuhaft | H04L 29/12066 711/118 |
| 2012/0185319 | A1* | 7/2012 | Visger | G06Q 30/02 705/14.26 |
| 2012/0246004 | A1* | 9/2012 | Book | G06Q 30/02 705/14.58 |
| 2012/0246553 | A1* | 9/2012 | Ong | G06F 17/30867 715/234 |
| 2012/0331032 | A1* | 12/2012 | Balachandran | H04L 69/164 709/202 |
| 2013/0041731 | A1* | 2/2013 | Navar | G06Q 20/027 705/14.12 |
| 2013/0110648 | A1* | 5/2013 | Raab | G06Q 30/0241 705/14.73 |
| 2013/0198274 | A1* | 8/2013 | Papakipos | H04L 51/32 709/204 |
| 2013/0198383 | A1* | 8/2013 | Tseng | H04L 63/102 709/225 |
| 2013/0268666 | A1* | 10/2013 | Wilson | H04L 67/02 709/225 |
| 2013/0290172 | A1* | 10/2013 | Mashinsky | G06Q 20/12 705/39 |
| 2014/0195380 | A1* | 7/2014 | Jamtgaard | H04L 67/22 705/26.61 |
| 2014/0278947 | A1* | 9/2014 | Raab | G06Q 30/0248 705/14.47 |
| 2014/0362808 | A1* | 12/2014 | Zhong | H04W 40/02 370/329 |
| 2014/0366117 | A1* | 12/2014 | Kumar | H04L 63/02 726/11 |
| 2015/0089592 | A1* | 3/2015 | Han | H04W 12/06 726/4 |
| 2015/0215359 | A1* | 7/2015 | Bao | H04L 65/605 709/219 |
| 2015/0295885 | A1* | 10/2015 | Congdon | H04L 61/2557 370/392 |
| 2016/0006760 | A1* | 1/2016 | Lala | H04L 63/1483 726/23 |
| 2016/0048868 | A1* | 2/2016 | Mirisola | G06Q 30/02 705/14.44 |
| 2016/0212695 | A1* | 7/2016 | Lynch | H04W 48/08 |
| 2016/0337333 | A1* | 11/2016 | Rollet | H04L 63/08 |

FOREIGN PATENT DOCUMENTS

| | | |
|---|---|---|
| CN | 102918527 A | 2/2013 |
| CN | 103747114 A | 4/2014 |
| CN | 104270405 A | 1/2015 |
| EP | 0835009 A2 | 4/1998 |
| JP | 2002229898 A | 8/2002 |
| JP | 2006134108 A | 5/2006 |
| JP | 2006352834 A | 12/2006 |
| JP | 2013098880 A | 5/2013 |
| WO | 97/48210 A1 | 12/1997 |
| WO | 02/103547 A1 | 12/2002 |
| WO | WO 2012/174499 A2 | 12/2012 |

OTHER PUBLICATIONS

Extended European Search Report issued in corresponding European Application No. 15175079.1 dated Oct. 15, 2015, 6 pages.
English translation of International Search Report issued in corresponding PCT Application No. PCT/CN2015/071878, mailed Mar. 30, 2015, 2 pages.
Office Action (including English translation) issued in corresponding Chinese Application No. 201410438588.9 dated Mar. 8, 2017, 10 pages.
Office Action and English translation for Japanese patent application No. 2016-544720 dated Jun. 6, 2017, 6 pages.

* cited by examiner

ROUTER-BASED NETWORKING CONTROL

CROSS REFERENCE TO RELATED APPLICATIONS

This application is a continuation-in-part of International Application No. PCT/CN2015/071878, filed Jan. 30, 2015, which is based upon and claims priority to Chinese Patent Application No. 201410438588.9, filed Aug. 29, 2014, the entire contents of which are incorporated herein by reference.

TECHNICAL FIELD

The present disclosure relates to the technical field of routers and router-based networking control.

BACKGROUND

A router is a device that communicates data between computers or computer networks. For example, it is common for routers to communicate data packets between computer networks. In examples, a router can be communicatively coupled to data lines from different networks, and where a data packet arrives at a line, the router reads address information in the packet to communicate it to its destination, which may or may not be its final destination. Routers can connect local area networks (LANs) and wide area networks (WANs), and terminal devices communicatively coupled to these networks. In some examples, a router can receive an Internet access request communicated by a terminal device. The router then can communicate the Internet access request to a web server indicated in the request. Afterwards, the router can receive source code of a webpage from the server, and communicate the source code to the terminal device.

SUMMARY

In an example of router-based networking control, a router can receive a Hypertext Transfer Protocol (HTTP) request communicated from a specific terminal device. The HTTP request can include an identification of the terminal device through terminal device information of the terminal device. The router can determine whether the terminal device has accessed a certain target webpage through the router, according to the terminal device information. For example, the terminal device information can be compared against a list of entries of terminal devices that have had requests for the webpage routed through the router. The list can be stored on the router in memory. Also, the router can determine whether it is the first time the terminal device has requested to access the webpage through the router. The router can also direct the terminal device to access the webpage directly or indirectly via the router. The router can also direct the terminal device to access the webpage directly or indirectly via an intermediate webpage. The router can also block the terminal device from accessing the target webpage, such as by using the intermediate webpage. In an example, where it is the first time the terminal device requests access to the webpage through the router, the router can reply by sending an HTTP response message (which can include a universal resource location (URL) address of an intermediate webpage of the target webpage) to the terminal device. This directs the terminal device to at least the intermediate webpage. Also, in an example, a next hit on the target webpage through the router can lead to bypassing the intermediate webpage and gaining direct access to the target webpage by the terminal device.

This summary and the following detailed descriptions are merely exemplary and do not limit the present disclosure.

BRIEF DESCRIPTION OF THE DRAWINGS

Non-limiting and non-exhaustive examples are described with reference to the following figures. The components in the drawings are not necessarily to scale, and like referenced numerals designate corresponding parts throughout the different views.

DETAILED DESCRIPTION

Subject matter described herein is intended to be construed as not being limited to examples set forth herein; examples are provided merely to be illustrative. The following detailed description is not intended to be limiting on the scope of what is claimed.

Figure 1:
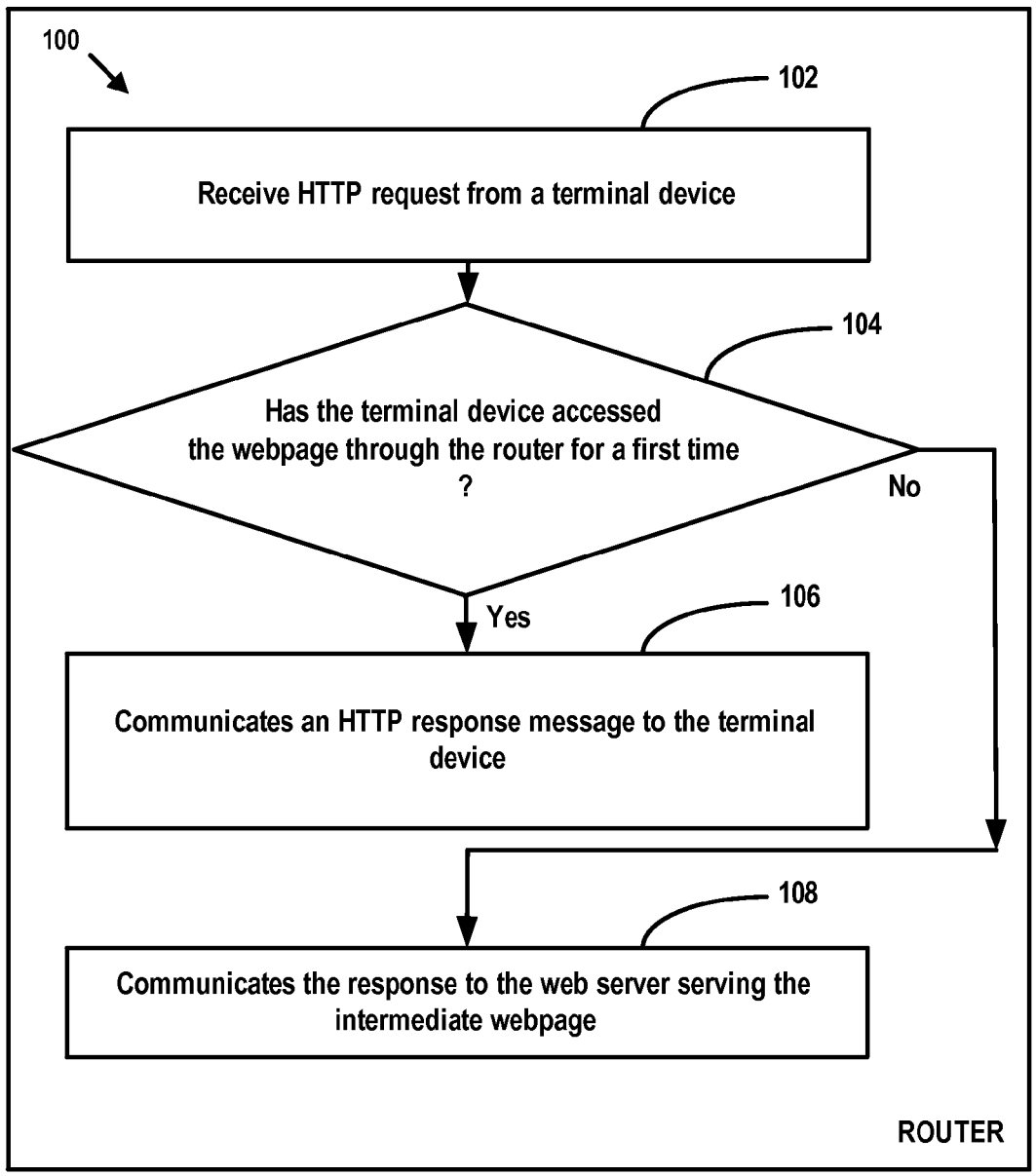
FIGS. 1-2 are flow charts illustrating example operations of router-based networking control.

FIG. 1 is a flow chart illustrating example operations 100 of router-based networking control. In an example, a router can be configured to perform the operations 100. At 102, an HTTP request, communicated by a terminal device is received, such as by a router configured to perform the operations 100.

In an example, the router can retrieve the HTTP request. The HTTP request can include an identifier of the terminal device. In an example, when the terminal device is communicatively coupled with the Internet through the router, the terminal device can communicate an Internet access request through the router. Also, where the terminal device accesses a web server through the router, the terminal device can communicate an HTTP request to the web server through the router. Prior to such a communication, the router can determine whether the Internet access request communicated by the terminal device is an HTTP request and direct the terminal device according to the determination. A header of the HTTP request can include information associated with the terminal device, such an identification of the terminal device. Also, the terminal device information may include a Medium Access Control (MAC) address and an Internet Protocol (IP) address of the terminal device, which may also act as identifiers.

At 104, the router can determine whether the terminal device has accessed the webpage through the router for the first time, such as according to the terminal device information. Where the terminal device communicatively couples with the Internet through the router, a Transmission Control Protocol (TCP) connection between the terminal device and the web server can be established. Accordingly, the terminal device can communicate a TCP packet to the server through the router. Where or after the router receives the TCP packet, the router can determine whether the TCP packet is at least part of an HTTP request. Where it is determined that the TCP packet is at least part of an HTTP request, the router can intercept the HTTP request and determine whether the terminal device has accessed the webpage through the router (such as whether it is the first time), according to the terminal device information. Where it is determined that the terminal device has accessed the webpage through the router for at least the first time, the router communicates an HTTP response message (which includes a URL address of the target webpage) to the terminal device, at 106. This directs the terminal device to at least the intermediate webpage. Also, in an example, a next hit on the target webpage through the router can lead to bypassing the intermediate webpage and gaining direct access to the target webpage by the terminal device. This allows the terminal device to skip the intermediate webpage according to the HTTP response message when the router has identified that the terminal device has already visited the target webpage. Where it is determined that the terminal device has not accessed the webpage through the router for the first time, the router communicates the response to the web server serving the intermediate webpage, at 108.

In an example, whether the terminal device accesses the webpage through the router (such as for the first time) may be determined by acquiring terminal device information (such as a MAC address of the terminal device) from the HTTP request and determining whether the terminal device information matches an entry in a permissible terminal device list. Where the permissible terminal device list does not include a matching entry, the terminal device is determined to be accessing the webpage through the router for the first time. Where the permissible terminal device list includes a matching entry, the terminal device is determined not to be accessing the webpage through the router for the first time. In an example, the list includes sub-lists of terminal devices blocked and terminal devices permitted to access the webpage. Also, the permissible terminal device list can include the terminal device information of all terminal devices that have accessed the target webpage through the router. Where the terminal device accesses the target webpage through the router for the first time, an HTTP response message (which may include a URL address of the webpage) is communicated to the terminal device so that the terminal device does not bypass an intermediate webpage to the target webpage, according to the HTTP response message. Where the terminal device does not access the webpage through the router for the first time, but has already accessed the webpage through the router, the HTTP request can be communicated to the web server serving the target webpage (e.g., the requested webpage).

Accordingly, in an example, after acquiring the HTTP request communicated by the terminal device, it can be determined whether the terminal device accessed the webpage through the router for the first time according to matching identity information of the terminal device (which is in the HTTP request) against a corresponding list. Where the terminal device has accessed the webpage through the router for at least the first time, the HTTP response message including the URL address of the target webpage is communicated to the terminal device. Thereby, the terminal device skips the intermediate webpage according to the HTTP response message.

Figure 2:
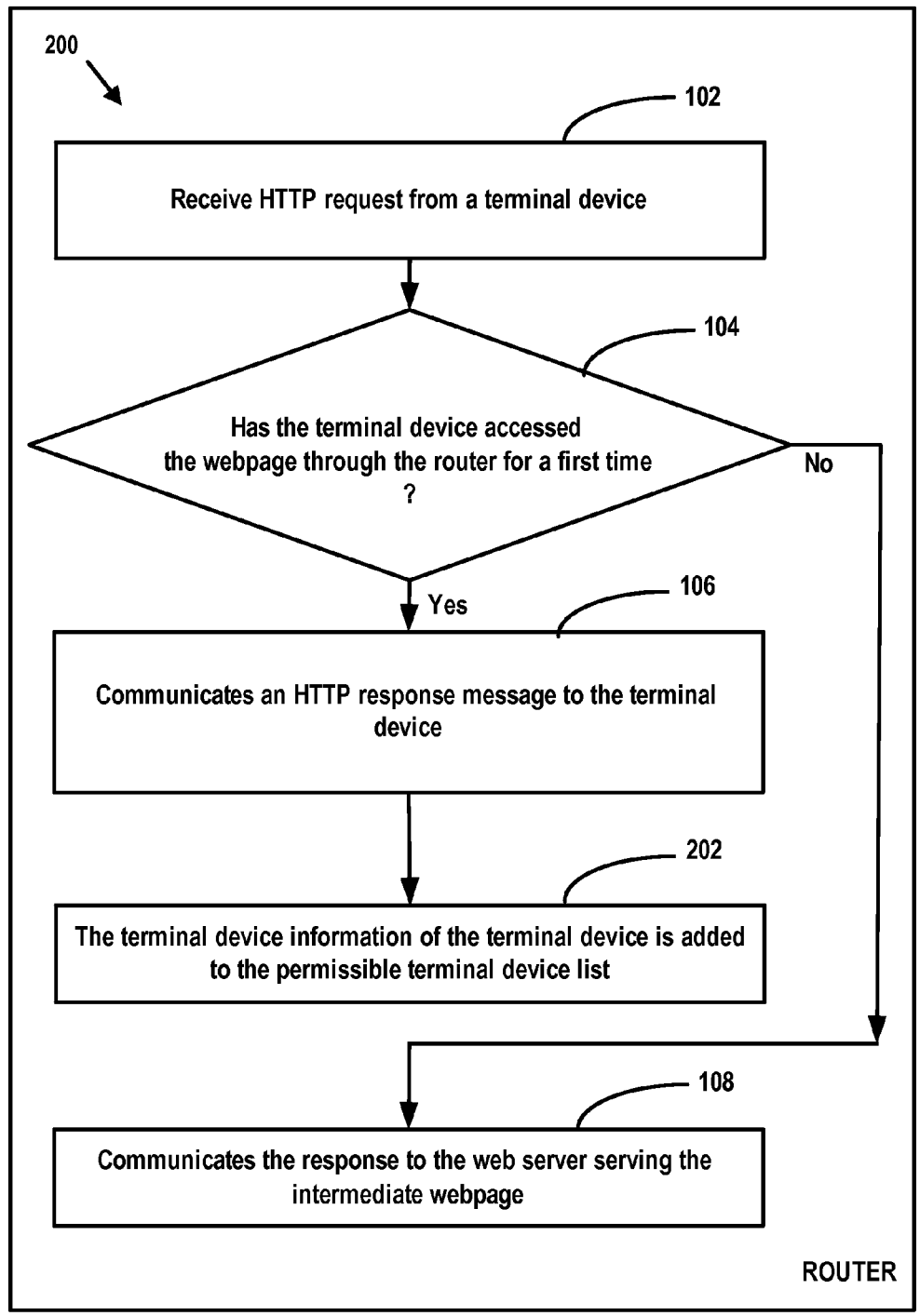

FIG. 2 is a flow chart illustrating example operations 200 of router-based networking control. As illustrated in FIG. 2, the operations 200 include the operations 102-108 of the operations 100; however, the operations 200 additionally include operation 202. At 202, the terminal device information of the terminal device is added to the permissible terminal device list, where it is determined that the terminal device is accessing the webpage through the router for the first time in operation 104. Not depicted, but noteworthy, in examples where it is determined that the access is not for the first time through the router, such requests after the first request may be recorded as well. This allows a router, for example, to track requests for certain webpages from certain terminal devices. This record of requests communicated through the router can then be used to make routing control decisions (such as by the router). Instead of logging terminal device interactions with webpages at the server serving the webpages, logging can occur at a router in route to the server. This logging can occur at multiple routers in route to a webserver, and resulting logs can be used for analysis of the internetwork routing associated with a webpage. The raw logs, analysis of the logs, or filtered logs derived from the raw logs can be used by these routers control internetworking between terminal devices and the webpage.

In an example, the router can match the terminal device information against a corresponding entry in the permissible terminal device list, where the terminal device accesses the webpage through the router for a second time or subsequent time. From this match, the router can identify that it is not the first time the webpage has been accessed by the terminal device via the router. Because a subsequent attempt to access the webpage through the router occurs, the terminal device is not directed to an intermediate webpage. Instead, the terminal device is directed to the requested webpage directly over network 301.

Figure 3:
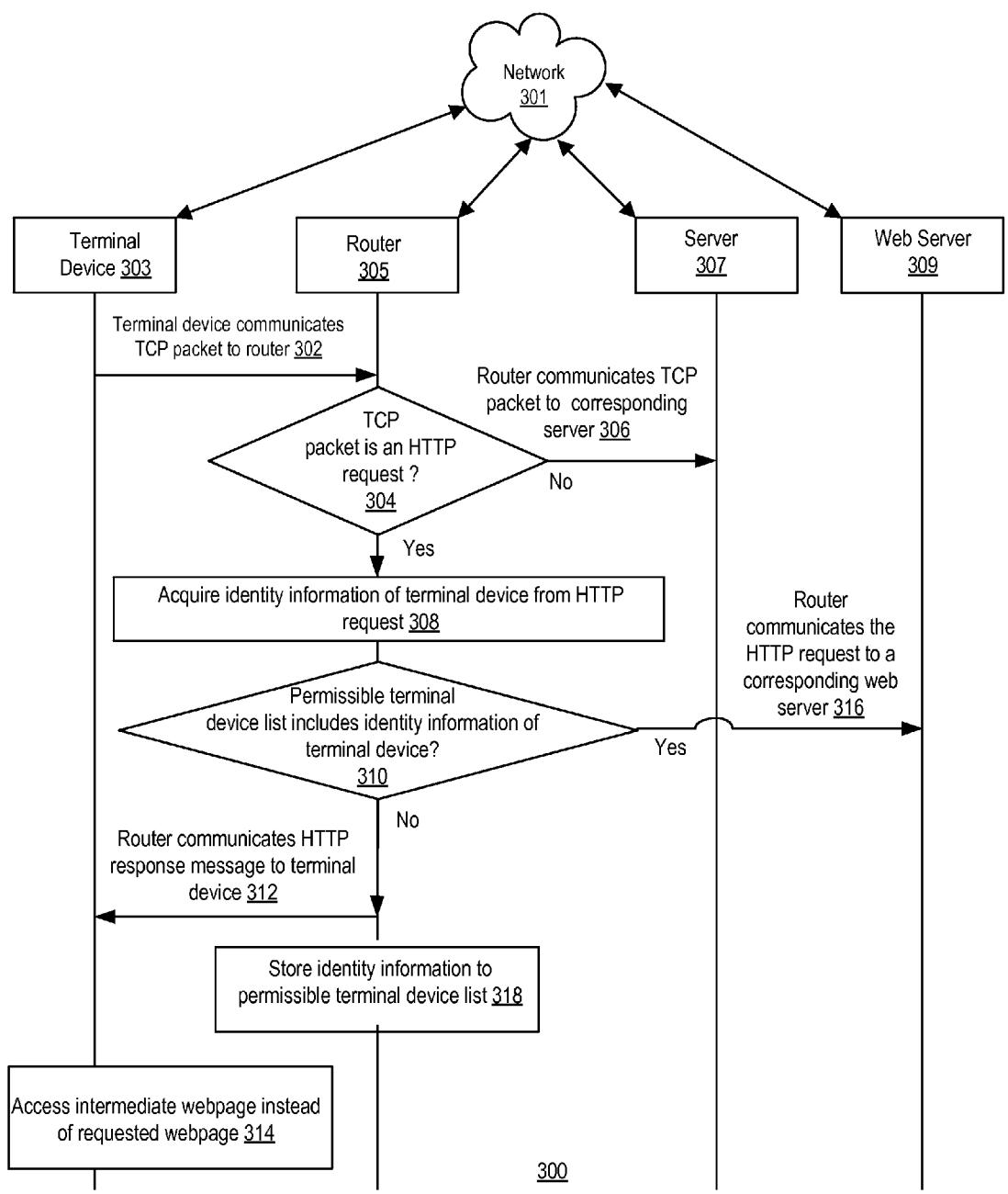
FIG. 3 is a flow chart illustrating example operations and devices of router-based networking control.

FIG. 3 is a flow chart illustrating example operations 300 of router-based networking control. At 302, a terminal device 303 communicates, over network 301, a TCP packet to a router 305. At 304, the router determines whether the TCP packet is an HTTP request. Where the TCP packet is an HTTP request, the router acquires identity information of the terminal device from the HTTP request, at 304. Where the TCP packet is not an HTTP request, the router communicates, over network 301, the TCP packet to a corresponding server 307, at 306. The corresponding server 307 illustrated in FIG. 3 is server that is configured to use TCP and may or may not use HTTP.

At 308, the router acquires identity information of the terminal device from the HTTP request. At 310, the router determines whether a permissible terminal device list includes the identity information of the terminal device. In an example, this permissible terminal device list can include identity information of each terminal device that has accessed a webpage through the router. Where the permissible terminal device list does not include the identity information of the terminal device, the router communicates, over network 301, the HTTP response message to the terminal device. In such an example, the HTTP response message can include a URL address of a webpage other than the requested webpage.

The other webpage may be an intermediate webpage with a link to the requested webpage. This intermediate webpage may include circuitry for determining whether to provide the link to the requested webpage, such as security instructions. Security instructions may include user authentication circuitry, such as security certificates or keys. The security instructions may also utilize username and password combinations. For example, the intermediate page may include circuitry that can identify whether the terminal device is permitted access to the requested webpage. Also, the intermediate page may include circuitry that requires the user to login to an account before accessing the requested webpage. The login feature may be provided through the intermediate webpage. Besides security instructions, the intermediate page may include content targeted to a first time viewer of the requested webpage. For example, the intermediate webpage may include content similar to the requested webpage, but also include added content target to first time viewers. For example, on a retail website, this could be one way of controlling promotions for first time viewers. All these features and more, are usually provided by client-side instructions, server-side instructions, or both. The operations herein, allow such features to at least be partially implemented by instructions and/or circuitry of a router.

In an example, the TCP packet communicated by the terminal device to the router is to request accessing a webpage corresponding to a URL address. The router can determine that the TCP packet is an HTTP request and acquire the MAC address of the terminal device from the HTTP request. The router can lookup whether the MAC address is included in the permissible terminal device list. Where the permissible terminal device list includes the MAC address, the router can identify that the terminal device has accessed the web server through the router for a first time. Where the permissible terminal device list does not include the MAC address, the router can identify that the terminal device is accessing the web server through the router for the first time.

At 312, the router communicates, over network 301, an HTTP response message to the terminal device. The HTTP response message can include a URL address of the intermediate webpage. Where the terminal device accesses the web server through the router for the first time, the router can add the identity information of the terminal device to the permissible terminal device list. The list can be stored on the server. The list can also be cached in cache memory for quicker retrieval of terminal device entries in the list. At 314, the terminal device can access the intermediate webpage instead of the requested webpage. Where the permissible terminal device list includes the identity information of the terminal device, at 316, the router communicates, over network 301, the HTTP request to a corresponding web server 309. At 318, the router adds the identity information to the permissible terminal device list and stores the list with the added information.

Figure 4:
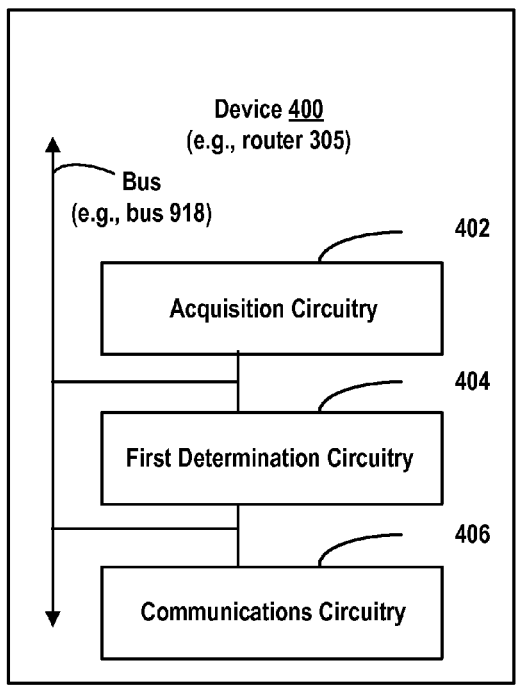
FIG. 4 is a block diagram illustrating an example electronic device associated with router-based networking control.

FIG. 4 block diagram illustrating an example electronic device 400 (such as the router 305 in FIGS. 1-3) associated with router-based networking control. As illustrated in FIG. 4, the device can include acquisition circuitry 402, first determination circuitry 404 and a communications circuitry 406. The acquisition circuitry 402 can be configured to acquire an HTTP request communicated by a terminal device, the HTTP request at least including identity information of the terminal device.

Figure 5:
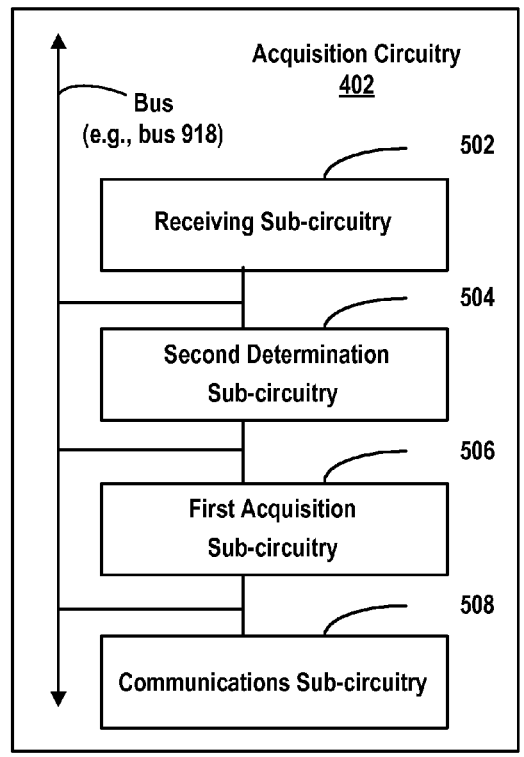
FIG. 5 is a block diagram illustrating example acquisition circuitry associated with router-based networking control.

In an example, as illustrated in FIG. 5, the acquisition circuitry 402 can include receiving sub-circuitry 502, second determination sub-circuitry 504, and first acquisition sub-circuitry 506. The receiving sub-circuitry 502 can be configured to receive a TCP protocol packet communicated by the terminal device. The second determination sub-circuitry 504 can be configured to determine whether the TCP packet received by the receiving sub-circuitry 502 is an HTTP request. The first acquisition sub-circuitry 506 is configured to obtain the HTTP request where the second determination sub-circuitry 504 determines that the TCP packet is an HTTP request. Also, the acquisition circuitry 402 includes communications sub-circuitry 508.

The communications sub-circuitry 508 is configured to communicate the TCP packet to a corresponding server, where the second determination sub-circuitry 504 determines that the TCP packet is not an HTTP request. The first determination circuitry 404 is configured to determine whether the terminal device accesses the webpage through the device 400 for the first time according to the identity information of the terminal device acquired by the acquisition circuitry 402.

Figure 6:
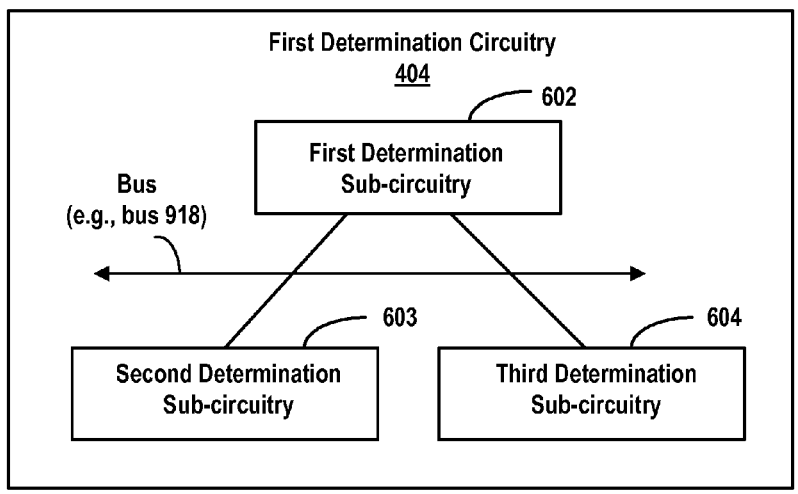
FIG. 6 is a block diagram illustrating example first determination circuitry associated with router-based networking control.

In an example, as illustrated in FIG. 6, the first determination circuitry 404 may include first determination sub-circuitry 602, second determination sub-circuitry 604, and third determination sub-circuitry 606. The first determination sub-circuitry 602 is configured to determine whether a permissible terminal device list includes the identity information of the terminal device acquired by the acquisition circuitry 402, the permissible terminal device list including the identity information of all the terminal devices that have accessed a webpage through the device 400. The second determination sub-circuitry 604 is configured to determine that the terminal device accesses the webpage through the device 400 for the first time, where the first determination sub-circuitry 602 determines that the permissible terminal device list does not include the identity information of the terminal device. The third determination sub-circuitry 606 is configured to determine that the terminal device does not access the webpage through the device 400 for the first time, where the first determination sub-circuitry 602 determines that the permissible terminal device list includes the identity information of the terminal device.

The communications circuitry 406 is configured to communicate an HTTP response message including a URL address of the intermediate webpage to the terminal device so that the terminal device skips to the intermediate webpage according to the HTTP response message, where the first determination circuitry 404 determines that the terminal device accessed the webpage through the device 400 for the first time.

In an example, the device for router-based networking control, such as the router 305, can acquire the HTTP request communicated by a terminal device through the acquisition circuitry 402, then determine whether the terminal device accessed the webpage through the device for router-based networking control for the first time according to the identity information of the terminal device included in the HTTP request, by the determination circuitry 404. Where the terminal device accesses the webpage through the device for router-based networking control for the first time, the HTTP response message including the URL address of the intermediate webpage is communicated to the terminal device. Thereby, the terminal device cannot skip the intermediate webpage according to the HTTP response message, unless the terminal device has already visited the webpage via the router.

Figure 7:
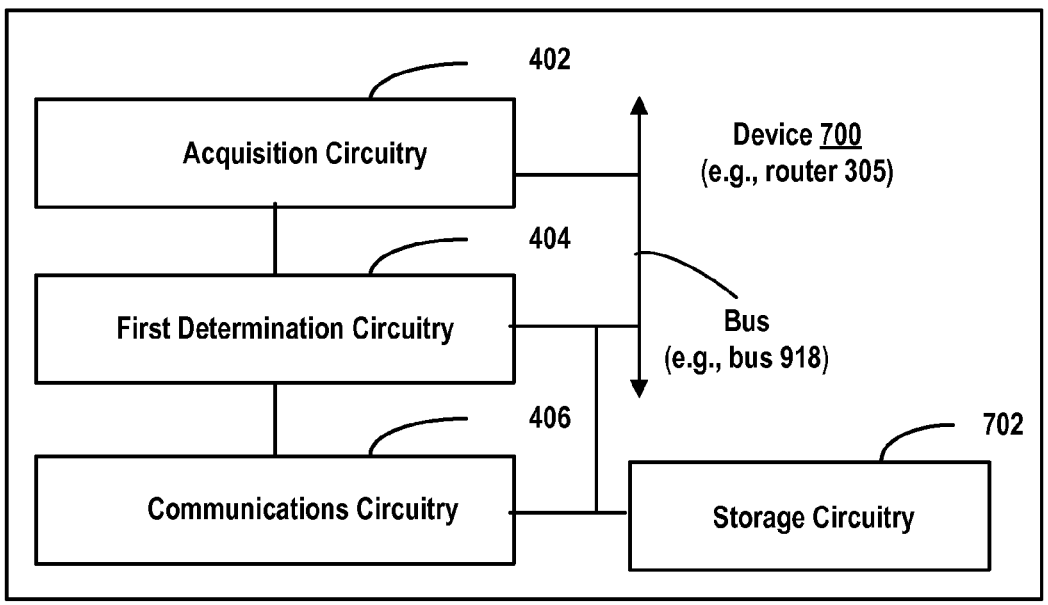
FIGS. 7-9 are block diagrams illustrating other example electronic devices associated with router-based networking control.

FIG. 7 block diagram illustrating an example electronic device 700 (such as the router 305 in FIGS. 1-3) associated with router-based networking control. As illustrated in FIG. 7, FIG. 7 includes similar features to FIG. 4 and also includes storage circuitry 702, such as memory specifically configured to store the identity information of the terminal device in the permissible terminal device list. The permissible terminal device list can include the identity information of all the terminal devices that have accessed a webpage through the example electronic device 700.

In FIG. 7, where the first determination circuitry 402 determines that the terminal device accesses the webpage through the router for the first time, the storage circuitry 702 is configured to store the identity information of the terminal device in the permissible terminal device list. Where the terminal device accesses the webpage through the device 700 again, the example device looks up the permissible terminal device list and can find that the permissible terminal device list includes the identity information of the terminal device. The device 700 can also determine that the terminal device does not access the webpage through the router for the first time. This occurs when the terminal device accesses the webpage through the device 700 for the first time. In such an instance, the terminal device can be directed to an intermediate webpage. When the terminal device accesses the webpage later, the terminal device can access the requested webpage directly, rather than being forwarded to the intermediate webpage over network 301.

Figure 8:
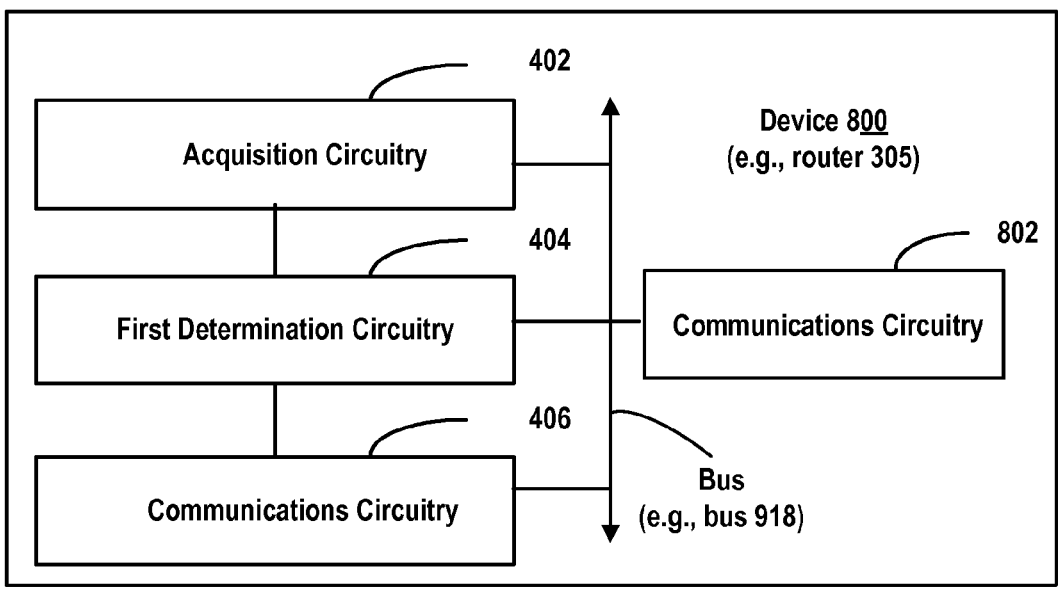

FIG. 8 block diagram illustrating an example electronic device 800 (such as the router 305 in FIGS. 1-3) associated with router-based networking control. FIG. 8 includes similar features to FIG. 4 and also includes the specific communications circuitry 802. The communications circuitry 802 can be configured to communicate the HTTP request to a corresponding web server serving the intermediate webpage, where the first determination circuitry 404 determines that the terminal device has not accessed the webpage through the device 800 for a first time.

Figure 9:
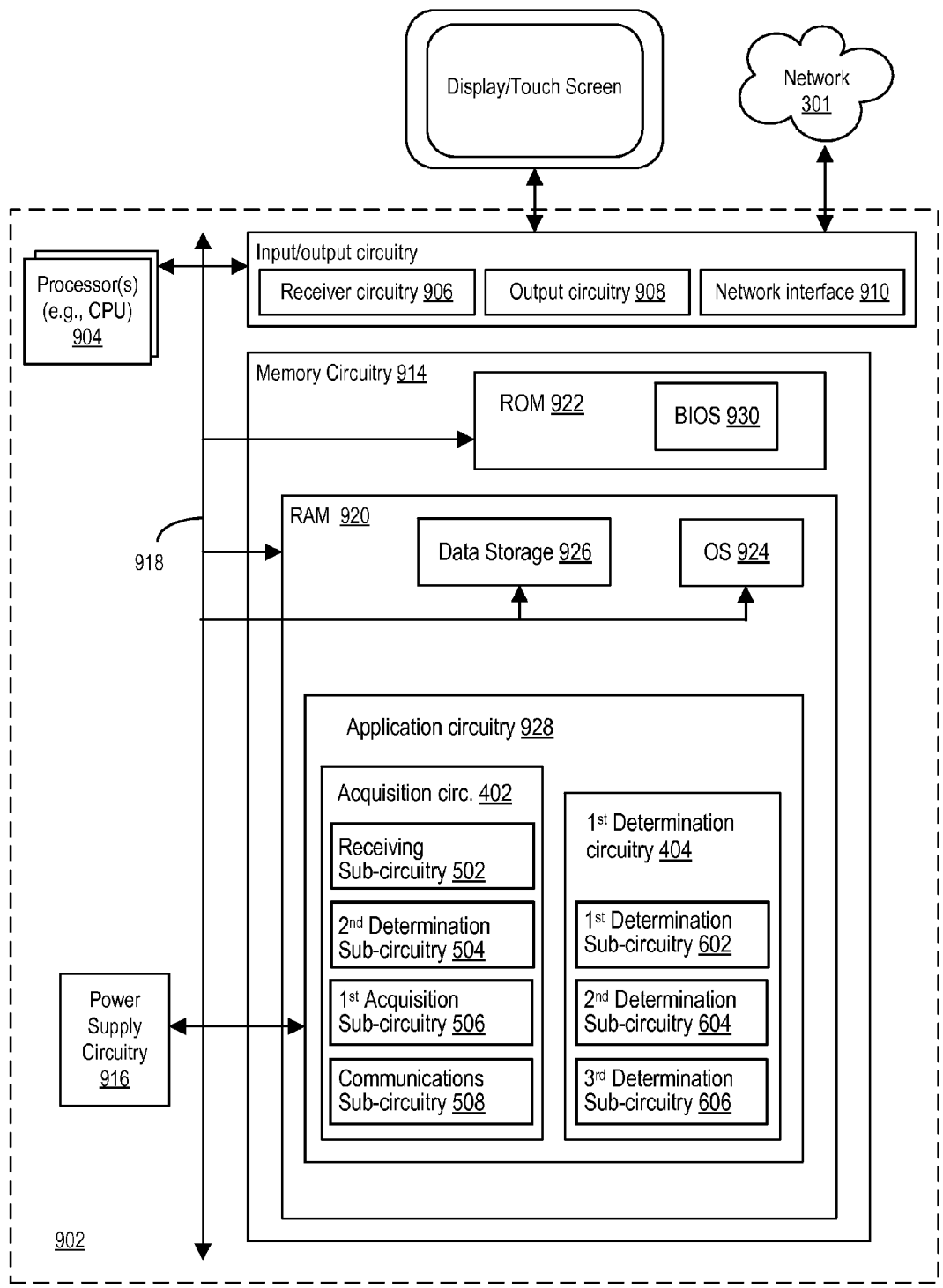

FIG. 9 is a block diagram illustrating an example device 902 for router-based networking control. The device 902 may be a server, router, or any combination thereof, such as the router 305. The device 902 includes a processor 904, input/out circuitry (such as receiver circuitry 906), and output circuitry 908. The input/output circuitry also includes a network interface 910. The device 902 also includes memory circuitry 914, power supply circuitry 916, and a communications bus 918 that connects the aforementioned elements of the device.

The processor 904 can be any type of data processing device, such as a central processing unit (CPU). In an example, the processor 904 can include multiple processors (such as a configuration of a primary CPU and co-processors). The device 902 may also include or at least connect to a display and a touchscreen or another technology for facilitating user input.

The memory circuitry 914, which can include random access memory (RAM) 920 or read-only memory (ROM) 922, can be enabled by various types of known memory devices. The RAM 920 can store data and instructions defining an operating system 924, data storage 926, and application circuitry 928. Although in FIG. 9 the application circuitry is depicted as a part of the RAM 920, in these examples and others, the application circuitry may include hardware (such as microprocessors), firmware, software, or any combination thereof. The ROM 922 can include basic input/output system (BIOS) 930 of the electronic device 902.

Aspects of the memory circuitry 914 can store various types of data to support operations of the device 902, such as in the data storage circuitry 926. Examples of such data include instructions for any applications or operations of the device 902, messages, pictures, and video. Aspects of the memory circuitry 914 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), such as ROM 922, a magnetic memory, a flash memory, a magnetic or optical disk, or any combination thereof.

The input/output components can include the interfaces for facilitating communication between any components of the electronic device 902, end users, and components of external devices (such as a digital camera, a digital video recorder, a display, or components of other devices of a network such a network 110 illustrated in FIG. 1). For example, such components can include a network card that is an integration of a receiver, a transmitter, and I/O interfaces. The I/O components, can include user interfaces such as monitors, keyboards, touchscreens, microphones, and speakers. Further, some of the I/O components and the bus 918 can facilitate communication between components of the electronic device 902, and can ease processing performed by the processor 904.

Multimedia devices included in or associated with the device 902 may include a screen providing an output interface between the device and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. The multimedia devices may include an audio component configured to output and/or input audio signals. For example, an audio component may include a microphone configured to receive an external audio signal when the device 902 is in an operation mode. The received audio signal may be further stored in a part of the memory circuitry 914 or transmitted via the network interface 910. In some examples of the device 902, a speaker may be included.

The depicted input/output circuitry of the device 902 may provide an interface between the processor 904 and peripheral interface components, such as a keyboard, a click wheel, an buttons, for example. The buttons may include a home button, a volume button, a starting button, and a locking button.

The network interface 910 can include a receiver and a transmitter (or a transceiver), and an antenna for wireless communications. The network interface 910 may be configured to facilitate communication, wired or wirelessly, between the device 902 and other devices. The device 902 can access a wireless network based on a communication standard, such as WiFi, 2G, or 3G, or a combination thereof. In an example, the network interface 910 may receive a broadcast signal or broadcast associated information from an external broadcast management system via a broadcast channel. Also, the network interface 910 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

The power supply circuitry 916 contains power components, and facilitates supply and management of power to the electronic device 902. The power supply circuitry 916 may provide power to various components of the device 902. The power supply circuitry 916 may include a power management system, one or more power sources, and any other components associated with the generation, management, and distribution of power in the device 902.

The aspects of the device 902 described herein may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. Also, aspects may be provided by a non-transitory computer-readable storage medium including instructions, such as included in the memory circuitry 914, executable by the processor 912, for performing operations described herein. For example, the non-transitory computer-readable storage medium may be a ROM, a RAM, a CD-ROM, a magnetic tape, a floppy disc, an optical data storage device, or any combination thereof.

In an example, an I/O component of the device 902, receiver circuitry 906, can be configured to receive image data of an image to be segmented including a background and a face of a person in a foreground. The image data can include data representative of a plurality of pixels of the image and a positioning result of a plurality of exterior contour points of the face. The output circuitry 908 can be configured to communicate the image with the segmented plurality of pixels to display circuitry.

The application circuitry 928 is communicatively coupled to the receiver circuitry 906 and the output circuitry 908. The application circuitry 928 can include complex router circuitry including the acquisition circuitry 402 and the first determination circuitry 404 illustrated in FIG. 4. The acquisition circuitry 402 of the application circuitry 928 includes the sub-circuitries illustrated in FIG. 5 and the first determination circuitry 404 of the application circuitry 928 includes the sub-circuitries illustrated in FIG. 6.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It should be appreciated that the present invention is not limited to the exact construction that has been described above and illustrated in the accompanying drawings, and that various modifications and changes can be made without departing from the scope thereof. It is intended that the scope of the invention should only be limited by the appended claims.

The invention claimed is:

1. A router-based method for controlling access to a webpage, comprising:
   receiving, by network communications circuitry of a router, a Hypertext Transfer Protocol (HTTP) request from a terminal device, the HTTP request including identity information of the terminal device;
   determining, by data processing circuitry of the router coupled to the network communications circuitry, whether the terminal device has accessed a target webpage indicated in the HTTP request through the router at any previous time, according to the identity information of the terminal device;
   communicating, by the network communications circuitry, an HTTP response message including a Uniform Resource Locator (URL) address of the target webpage to the terminal device so that the terminal device bypasses an intermediate webpage of the target webpage according to the HTTP response message, based on the determination that the terminal device has previously accessed the target webpage through the router; and
   communicating, by the network communications circuitry, the HTTP request to a web server serving the intermediate webpage so that the intermediate webpage is communicated to the terminal device instead of the target webpage, based on the determination that the terminal device has not previously accessed the target webpage through the router, wherein the intermediate webpage includes specific content targeted to a first time viewer of the target webpage when determining that the terminal device is accessing the web server through the router for the first time.

2. The method according to claim 1, further comprising storing, in a memory device of the router, the permissible terminal device list with the added identity information of the terminal device.

3. The method according to claim 2, further comprising adding, by the data processing circuitry, the identity information of the terminal device to a permissible terminal device list, if the identity information is not included on the list.

4. The method according to claim 1, wherein the determining whether the terminal device has previously accessed a target webpage through the router further includes determining whether a permissible terminal device list, stored in a memory device of the router, includes the identity information of the terminal device.

5. The method according to claim 1, further comprising:
   receiving, by the network communications circuitry, a Transmission Control Protocol (TCP) packet from the terminal device;
   determining, by the data processing circuitry, that the TCP packet includes the HTTP request; and
   retrieving, by the data processing circuitry, the HTTP request from the TCP packet.

6. The method according to claim 1, wherein the intermediate webpage includes security instructions for determining whether to provide a link to the target webpage.

7. The method according to claim 6, wherein the security instructions may include user authentication circuitry.

8. The method according to claim 1, wherein the intermediate webpage includes security instructions that can identify whether the terminal device is permitted access to the target webpage.

9. The method according to claim 1, wherein the intermediate webpage includes specific content related to the target webpage.

10. The method according to claim 1, further comprising: determining that the terminal device is accessing the web server through the router for the first time when determining that a permissible terminal device list, stored in a memory device of the router, does not include the identity information of the terminal device.

11. A router, comprising:
   a part of network communications circuitry configured to receive a Hypertext Transfer Protocol (HTTP) request communicated from a terminal device, the HTTP request including identity information of the terminal device;
   data processing circuitry of the router coupled to the network communications circuitry, configured to determine whether the terminal device has accessed a target webpage indicated in the HTTP request through the router at any previous time, according to the identity information of the terminal device; and a part of the network communications circuitry configured to:

communicate an HTTP response message including a Uniform Resource Locator (URL) address of the target webpage to the terminal device so that the terminal device bypasses an intermediate webpage of the target webpage according to the HTTP response message, based on the determination that the terminal device has accessed the target webpage through the router at any previous time; and communicate the HTTP request to a web server serving the intermediate webpage so that the intermediate webpage is communicated to the terminal device instead of the target webpage, based on the determination that the terminal device has not accessed the target webpage through the router at any previous time, wherein the intermediate webpage includes specific content targeted to a first time viewer of the target webpage when determining that the terminal device is accessing the web server through the router for the first time.

12. The router according to claim 11, wherein the data processing circuitry is further configured to add the identity information of the terminal device to a permissible terminal device list, if the identity information is not included on the list.

13. The router according to claim 12, wherein the data processing circuitry is further configured to direct storage of the permissible terminal device list with the added identity information of the terminal device to a memory device of the router.

14. The router according to claim 11, wherein the data processing circuitry is further configured to determine whether a permissible terminal device list, stored in a memory device of the router, includes the identity information of the terminal device.

15. The router according to claim 11, wherein the network communications circuitry is further configured to receive a Transmission Control Protocol (TCP) packet from the terminal device, and wherein the data processing circuitry is further configure to determine that the TCP packet includes the HTTP request and retrieve the HTTP request from the TCP packet.

16. A non-transitory computer readable medium associated with a router, comprising:

instructions executable by a processor to receive a Hypertext Transfer Protocol (HTTP) request from a terminal device, the HTTP request including identity information of the terminal device;

instructions executable by a processor to determine whether the terminal device has accessed a target webpage indicated in the HTTP request through the router at any previous time, according to the identity information of the terminal device;

instructions executable by a processor to communicate an HTTP response message including a Uniform Resource Locator (URL) address of the target webpage to the terminal device so that the terminal device bypasses an intermediate webpage of the target webpage according to the HTTP response message, based on the determination that the terminal device has accessed the target webpage through the router at any previous time; and instructions executable by a processor to communicate the HTTP request to a web server serving the intermediate webpage so that the intermediate webpage is communicated to the terminal device instead of the target webpage, based on the determination that the terminal device has not accessed the target webpage through the router at any previous time, wherein the intermediate webpage includes specific content targeted to a first time viewer of the target webpage when determining that the terminal device is accessing the web server through the router for the first time.

17. The medium according to claim 16, further comprising instructions executable by a processor to add the identity information of the terminal device to a permissible terminal device list, if the identity information is not included on the list.

18. The medium according to claim 17, further comprising instructions executable by a processor to direct storage of the permissible terminal device list with the added identity information of the terminal device to a memory device of the router.

19. The medium according to claim 16, further comprising instructions executable by a processor to determine whether a permissible terminal device list, stored in a memory device of the router, includes the identity information of the terminal device.

20. The medium according to claim 16, further comprising:

instructions executable by a processor to receive a Transmission Control Protocol (TCP) packet from the terminal device;

instructions executable by a processor to determine that the TCP packet includes the HTTP request; and instructions executable by a processor to retrieve the HTTP request from the TCP packet.

* * * * *